US010767507B2

(12) United States Patent
Khibnik et al.

(10) Patent No.: US 10,767,507 B2
(45) Date of Patent: Sep. 8, 2020

(54) FOREIGN OBJECT DEBRIS TRENDING CONCEPT AND DESIGN

(71) Applicant: United Technologies Corporation, Farmington, CT (US)

(72) Inventors: Alexander I Khibnik, Glastonbury, CT (US); Gregory S Hagen, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 271 days.

(21) Appl. No.: 15/350,886

(22) Filed: Nov. 14, 2016

(65) Prior Publication Data
US 2018/0135455 A1   May 17, 2018

(51) Int. Cl.
*F01D 21/00*   (2006.01)
*G01M 15/14*   (2006.01)
*F02C 7/05*   (2006.01)
*G05B 23/02*   (2006.01)

(52) U.S. Cl.
CPC ............. *F01D 21/003* (2013.01); *F02C 7/05* (2013.01); *G01M 15/14* (2013.01); *F05D 2220/32* (2013.01); *F05D 2260/607* (2013.01); *F05D 2260/80* (2013.01); *F05D 2260/81* (2013.01); *F05D 2260/83* (2013.01); *G05B 23/0221* (2013.01); *Y02T 50/675* (2013.01)

(58) Field of Classification Search
None
See application file for complete search history.

(56) References Cited

U.S. PATENT DOCUMENTS

| 2010/0114502 A1* | 5/2010 | Badami | F03D 17/00 702/35 |
| 2013/0197747 A1* | 8/2013 | Tourin | F01D 21/003 701/34.4 |
| 2015/0330869 A1* | 11/2015 | Ziarno | G01M 15/14 701/34.4 |

* cited by examiner

*Primary Examiner* — Matthew G Marini
(74) *Attorney, Agent, or Firm* — Snell & Wilmer L.L.P.

(57) ABSTRACT

A system and method for detecting foreign object debris damage is disclosed. A method for foreign object debris detection in a gas turbine engine may include receiving, by a controller, a first time-series data from a database, wherein the first time-series data comprises a feature, pre-processing, by the controller, the first time-series data to generate a second time-series data, generating a third time-series data via an anomaly detector model, sending, by the controller, the third time-series data to a foreign object debris (FOD) damage model, and determining, by the controller, that a FOD event has occurred based on data received from the FOD damage model. In various embodiments, the method may further comprise generating, by the controller, a health report (HR).

20 Claims, 8 Drawing Sheets

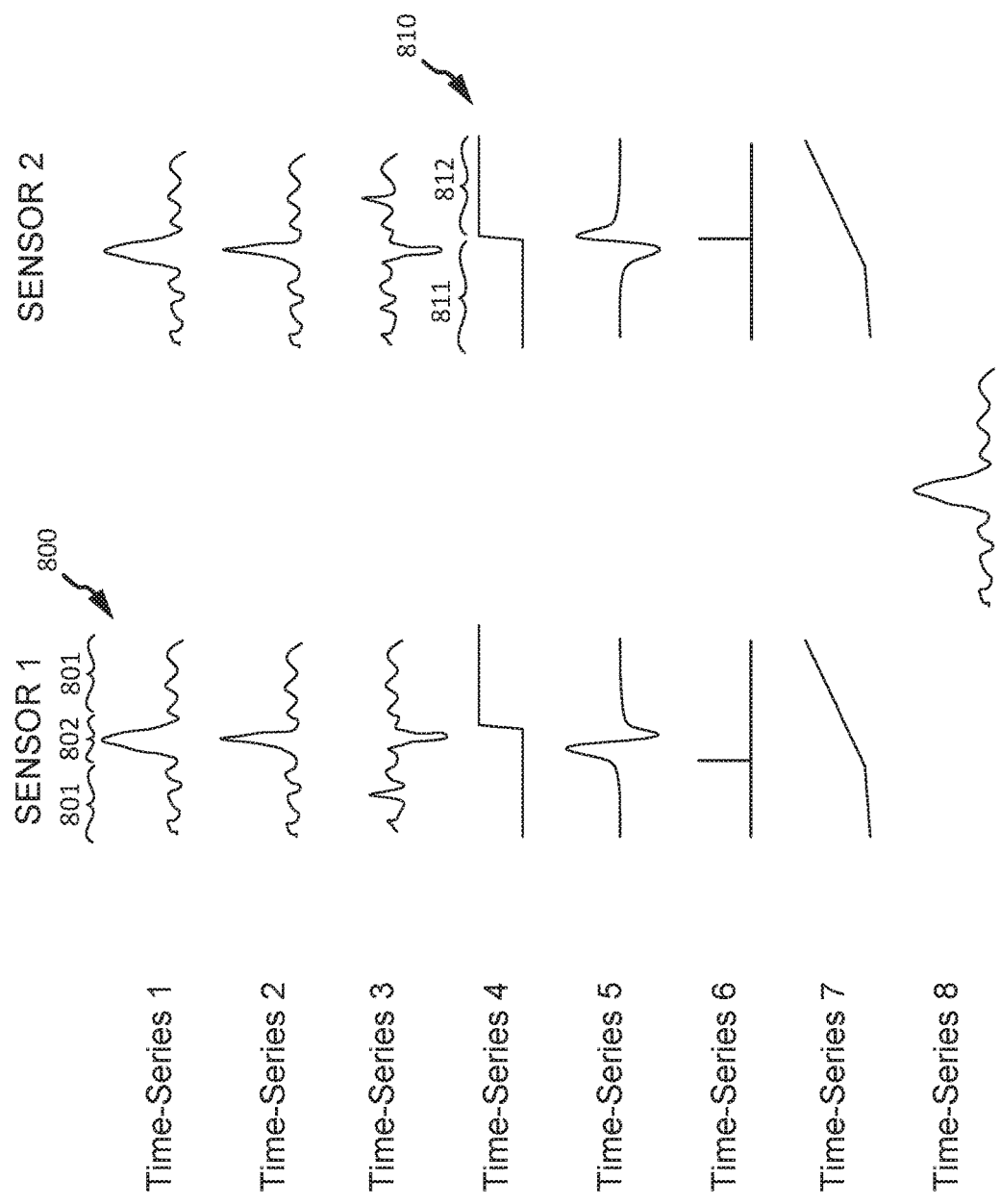

FOREIGN OBJECT DEBRIS TRENDING CONCEPT AND DESIGN

STATEMENT OF GOVERNMENT INTEREST

This disclosure was made with government support under contract No. N00019-13-C-0016 awarded by the United States Navy. The government has certain rights in the disclosure.

FIELD

The present disclosure relates generally to gas turbine engines, and more specifically, to systems and methods for monitoring the health of gas turbine engines.

BACKGROUND

Gas turbine engines may be subjected to severe instant or incipient damage as a consequence of Foreign Object Debris (FOD) ingestion. In order to mitigate the risk of FOD events, gas turbine engines undergo complex and time consuming periodic inspections. While FOD detection systems and sensors may reduce the frequency of inspections, they tend to generate an unacceptable level of false alarms.

SUMMARY

Systems and methods for detecting foreign object debris damage in a gas turbine engine are disclosed. In various embodiments, a method for foreign object debris detection in a gas turbine engine may comprise receiving, by a controller, a first time-series data from a database, wherein the first time-series data comprises a feature, pre-processing, by the controller, the first time-series data to generate a second time-series data, generating a third time-series data via an anomaly detector model, sending, by the controller, the third time-series data to a foreign object debris (FOD) damage model, and determining, by the controller, that a FOD event has occurred based on data received from the FOD damage model.

In various embodiments, the method may further comprise generating, by the controller, a health report (HR). The third time-series data may comprise an anomaly detection signal, the anomaly detection signal being generated based on a pre-determined feature. The pre-processing may cause the controller to calculate a derived parameter, wherein the derived parameter is calculated using the first time-series data. The pre-processing may cause the controller to evaluate an integrity of the first time-series data. The pre-processing may cause the controller to evaluate a health of the debris monitoring sensor. The pre-processing may cause the controller to clean the first time-series data. The pre-processing may cause the controller to align the first time-series data with respect to time. The pre-processing may cause the controller to define a filter for the first time-series data. The pre-processing may cause the controller to define a point of interest of the first time-series data. The generating the third time-series data may include calculating, by the controller, an anomaly detector, wherein the anomaly detector is based upon the second time-series data.

The calculating the anomaly detector may include analyzing the second time-series data and generating the third time-series data, the third time-series data comprising a vector of values including the anomaly detector. The third time-series vector may comprise a Boolean value. The third time-series vector may comprise a characteristic value providing information about an anomaly. The anomaly detector model may be configured to produce the anomaly detection signal comprising the anomaly detector in response to receiving the second time-series data, and wherein the FOD damage model is configured to generate the health report (HR). At least one of the first time-series data, the second time-series data, the third time-series data, the anomaly detection signal, the anomaly detector, the derived parameter, the FOD damage HR, the anomaly detector model, or the FOD damage model may be stored in a database, wherein the database is in electronic communication with the controller.

A system for foreign object debris detection in a gas turbine engine may comprise a controller in communication with a memory, the controller configured to receive a time-series data, wherein the time-series data is based upon a debris monitoring sensor signal, evaluate an integrity of the time-series data, calculate a derived parameter, wherein the derived parameter is calculated using the time-series data, and calculate an anomaly detector, the anomaly detector corresponding to a detected anomaly based upon a feature in the time-series data.

In various embodiments, the controller may be further configured to report a foreign object debris (FOD) damage health report (HR) if the calculated anomaly indicates the occurrence of a FOD event, evaluate a health of a debris monitoring sensor, clean the time-series data, align the time-series data with respect to time, define a filter for the time-series data, or define a point of interest of the time-series data. The calculating the anomaly detector may include analyzing the time-series data and generating a time-series vector of values including the anomaly detector. The time-series vector may comprise a Boolean value. The controller may implement an anomaly detector model, the anomaly detector model configured to produce an anomaly detection signal comprising the anomaly detector in response to receiving the time-series data, and wherein the controller implements a FOD damage model, the FOD damage model configured to produce a FOD damage estimate in response to receiving the anomaly detection signal. At least one of the time-series data, the anomaly detection signal, the anomaly detector, the derived parameter, the FOD damage HR, the anomaly detector model, or the FOD damage model may be stored in a database, wherein the database is in electronic communication with the controller. The system for foreign object debris detection may further comprise a debris monitoring sensor proximate at least one of a fan section, a compressor section, a combustor section or a turbine section of the gas turbine engine.

An article of manufacture including a tangible, non-transitory computer-readable storage medium may have instructions stored thereon for detecting foreign object debris in a gas turbine engine that, in response to execution by a controller, cause the controller to perform operations comprising receiving, by the controller, a time-series data, wherein the time-series data is based upon a debris monitoring sensor signal, evaluating, by the controller, an integrity of the time-series data, calculating, by the controller, a derived parameter, wherein the derived parameter is calculated using the time-series data, and calculating, by the controller, an anomaly detector, the anomaly detector corresponding to a detected anomaly based upon a feature in the time-series data.

In various embodiments, the operations may further comprise reporting, by the controller, a foreign object debris (FOD) damage health report (HR). The operations may further comprise evaluating, by the controller, a health of the debris monitoring sensor. The operations may further comprise at least one of cleaning, by the controller, the time-series data, aligning, by the controller, the time-series data with respect to time, defining, by the controller, a filter for the time-series data, or defining, by the controller, a point of interest of the time-series data.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures.

FIG. 8 illustrates first time-series signals having features which may define an anomaly, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Figure 1:
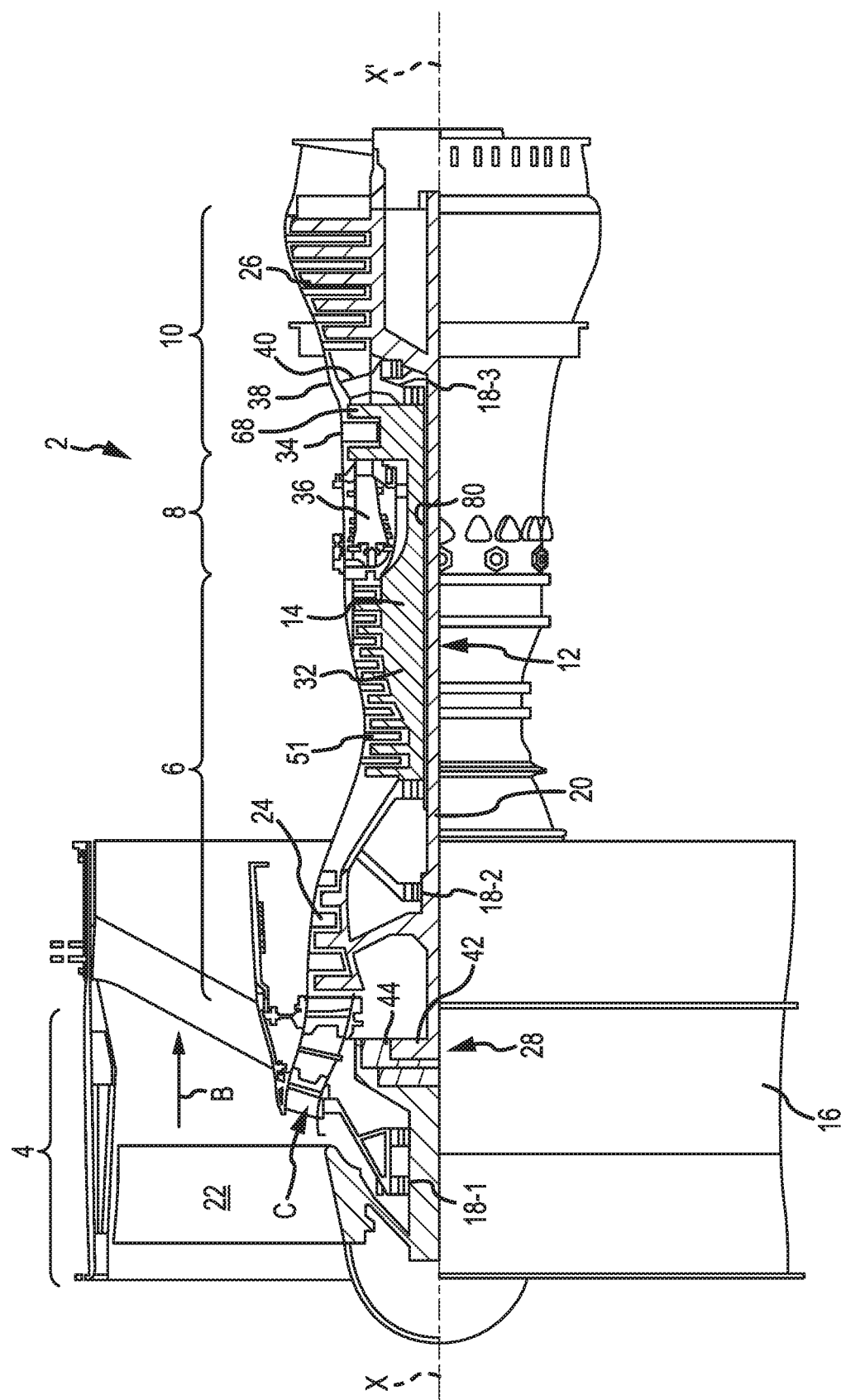
FIG. 1 illustrates a gas turbine engine, in accordance with various embodiments.

In various embodiments, and with reference to FIG. 1, an exemplary gas turbine engine 2 is provided. Gas turbine engine 2 is a two-spool turbofan that generally incorporates a fan section 4, a compressor section 6, a combustor section 8 and a turbine section 10. Vanes 51 may be disposed throughout the gas turbine engine 2. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

An engine 2 may comprise a rotor blade 68 or a stator vane 51. Stator vanes 51 may be arranged circumferentially about the engine central longitudinal axis X-X'. Stator vanes 51 may be variable, meaning the angle of attack of the airfoil of the stator vane may be variable relative to the airflow proximate to the stator vanes 51. The angle of attack of the variable stator vane 51 may be variable during operation, or may be fixable for operation, for instance, being variable during maintenance or construction and fixable for operation. In various embodiments, it may be desirable to affix a variable vane 51 in fixed position (e.g., constant angle of attack).

Figure 2:
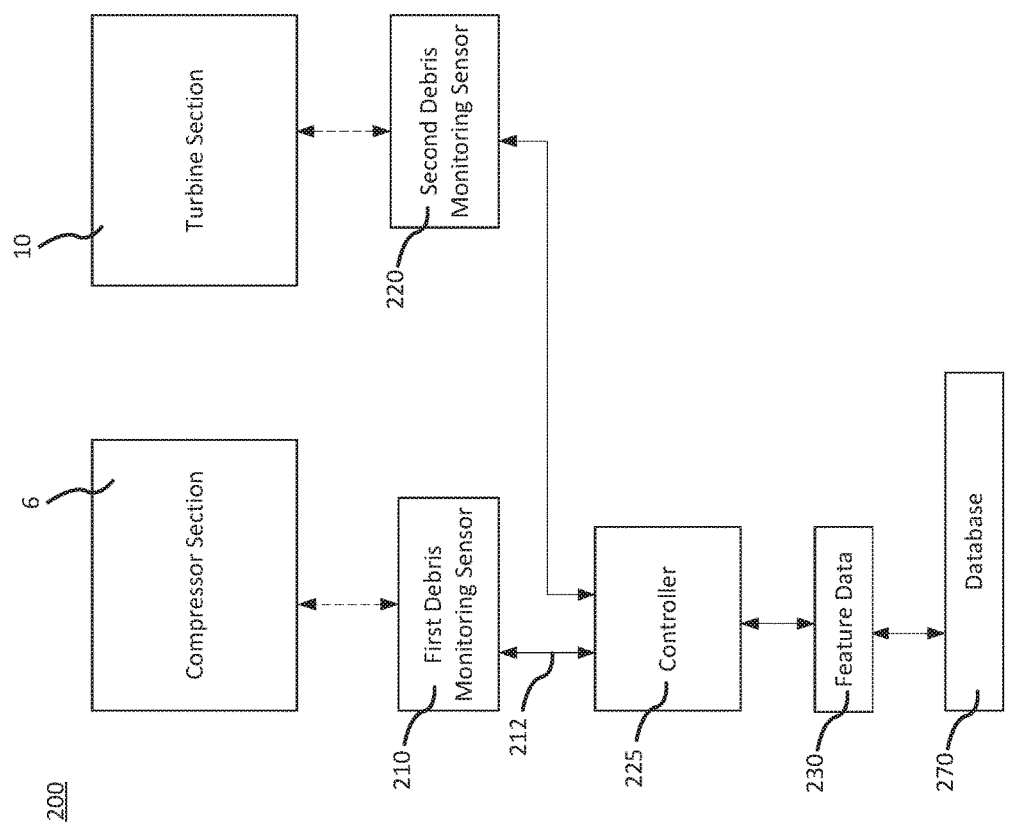
FIG. 2 illustrates a block diagram of a FOD detection system for a gas turbine engine, in accordance with various embodiments.

In various embodiments, and with reference to FIG. 2, a FOD detection system 200 is disclosed. In various embodiments, FOD detection system 200 may comprise an on-board portion of a FOD detection system. Gas turbine engine 2 may be operatively connected to FOD detection system 200. Gas turbine engine 2 may be operatively connected to FOD detection system 200 using any suitable method disclosed herein and/or known in the art. FOD detection system 200 may comprise a single sensor or may comprise a plurality of sensors. In various embodiments, FOD detection system 200 comprises a first sensor (also referred to herein as first debris monitoring sensor) 210 and a second sensor (also referred to herein as second debris monitoring sensor) 220. Although illustrated as having first sensor 210 and a second sensor 220, FOD detection system 200 may include any number of sensors located at any location of gas turbine engine 2 (see FIG. 1). It is contemplated that any number of sensors may be located anywhere inside the gas turbine engine or outside of the gas turbine engine in its close proximity. The sensors may be excited by FOD or Domestic Object Damage (DOD). The sensors may be collocated. A first debris monitoring sensor, such as first sensor 210, may be proximate at least one of a fan section, a compressor section, a combustor section, or a turbine section of a gas turbine engine, such as gas turbine engine 2. First sensor 210 is proximate to and configured to monitor the compressor section 6 of gas turbine engine 2. Second sensor 220 is proximate to and configured to monitor the turbine section 10 of gas turbine engine 2.

In various embodiments first sensor 210 may be configured to provide a first sensor signal at a first rate, such as, for example, 1000 Hz. In various embodiments second sensor 220 is configured to provide a second sensor signal at a second rate. In various embodiments, the first rate and the second rate may be different or may be similar. In various embodiments, a sensor signal may comprise a voltage signal, a current signal, or any other suitable signal. In this regard, first sensor 210 may output sensor signal 212.

Controller 225 may be in logical and/or electronic communication with first debris monitoring sensor 210 and second debris monitoring sensor 220. In various embodiments, the sensor signal 212 may undergo initial/primary data processing (also referred to herein as pre-processing), by controller 225, and be stored to database 270 as feature data (also referred to herein as first time-series data) 230. Such pre-processing may include, digitizing, compressing, averaging, filtering, or any other suitable operations. In various embodiments, feature data 230 may comprise a time-series data. Feature data 230 may comprise data stored at a third rate. The third rate may be less than the first rate. For example, feature data 230 may comprise a sampling rate of 1 Hz. However, in various embodiments, feature data 230 may comprise a sampling rate of between 0.01 Hz and 1 kHz, and in various embodiments, a sampling rate of between 1 Hz and 60 Hz.

In various embodiments, controller 225 and database 270 may be located on-board an aircraft. In this regard, controller 240 may be located within the aircraft's full authority digital engine control ("FADEC"), electronic engine control ("EEC") and/or located within the aircraft's health monitoring systems.

Figure 5:
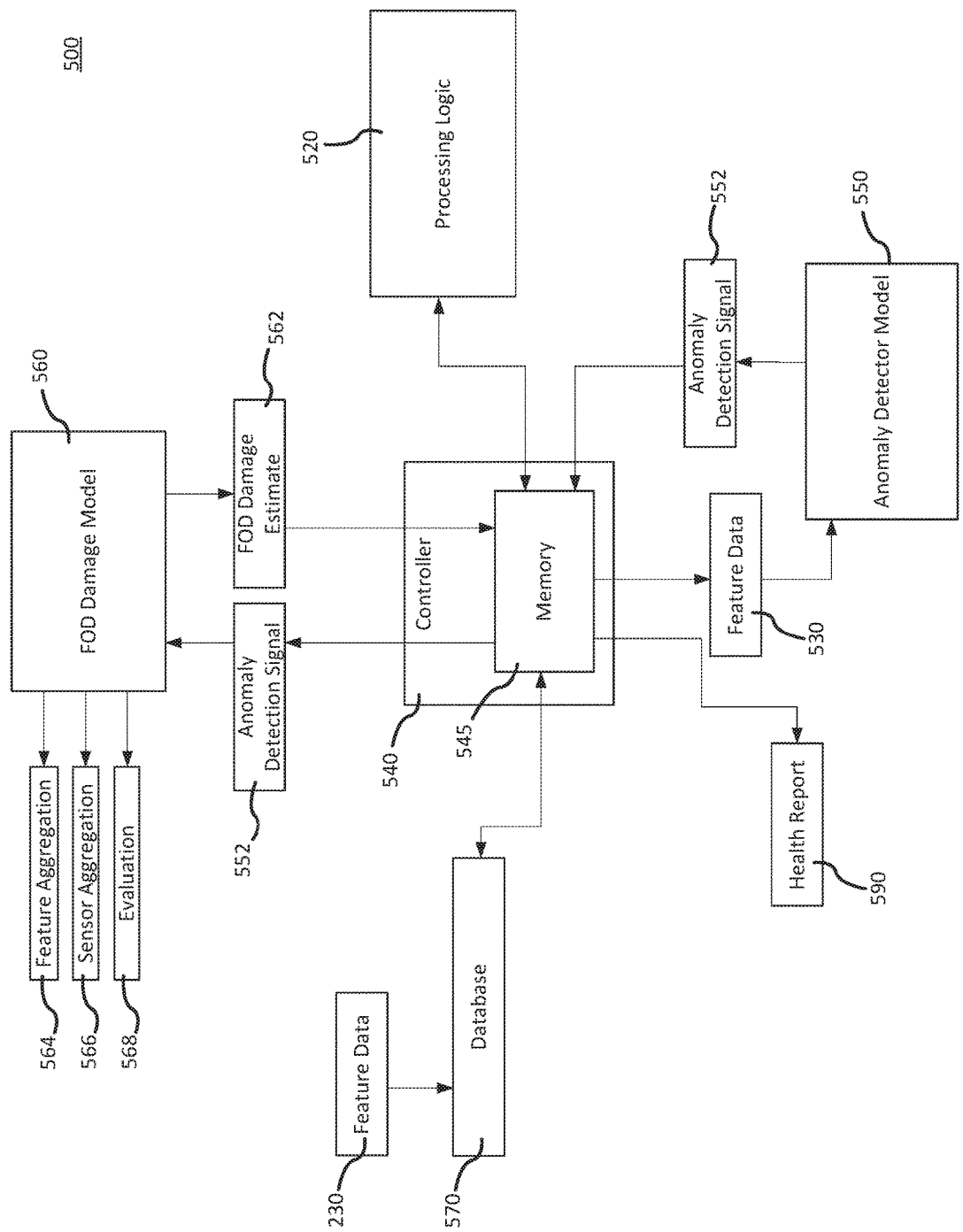
FIG. 5 illustrates a block diagram of an FOD detection system, in accordance with various embodiments.

With respect to FIG. 5, elements with like element numbering, as depicted in FIG. 2, are intended to be the same and will not necessarily be repeated for the sake of clarity.

With reference to FIG. 5, FOD detection system 500 is illustrated, in accordance with various embodiments. In various embodiments, FOD detection system 500 may include controller 540. Controller 540 may comprise any suitable processor capable of sending and receiving data, and performing operations. In various embodiments, FOD detection system 500 may comprise an off-board portion of a FOD detection system. In various embodiments, feature data 230 may be moved from database 270 (see FIG. 2) to an off-board database, or database located off of an aircraft, or database 570. In this regard, controller 540 may be located externally from an aircraft, in any suitable computer-based system. Controller 540 may be configured to execute instructions stored on a tangible, non-transitory computer readable medium, causing controller 540 to perform various operations. In various embodiments, controller 540 may also include any combination of processing circuits known in the art, such as one or more microprocessors, microcontrollers, digital signal processors, and/or programmable logic devices. However, although described as an off-board system, FOD detection system 500 may comprise an on-board portion of a FOD detection system.

Controller 540 may be in logical and/or electronic communication with anomaly detector model 550, FOD damage model 560, database 570, and/or processing logic 520. Controller 540 may be in logical and/or electronic communication using any method disclosed herein or known in the art, such as, for example, via wiring or radio frequency transmissions. In various embodiments, anomaly detector model 550 and/or FOD damage model 560 may be implemented in or by controller 540.

A processing logic 520 may be in logical and/or electronic communication with controller 540. In various embodiments, processing logic 520 may include instructions for various processing operations. In various embodiments, processing logic 520 may comprise a pre-processing logic. For example, instructions stored in processing logic 520 may be performed on feature data 230 to generate feature data 530. Stated another way, feature data 230 may be pre-processed before being sent to anomaly detector model 550. For example, processing logic 520 may include instructions for data cleaning, resampling, interpolation, normalization, data integrity detection, sensor health detection, parameter derivation, filtering, defining points of interest, time alignment, etc. The details of these instructions will become more apparent herein with regards to the methods described in FIG. 3 and FIG. 4. In this regard, feature data 230 may optionally undergo these various processes before being sent to anomaly detector model 550. Thus, feature data (also referred to herein as second time-series data) 530 being sent to anomaly detector model 550 may be similar to feature data 230 or may comprise feature data 230 after having undergone various processing via processing logic 520. Pre-processing feature data 230 may improve the quality of the time-series data used for anomaly detection. Instructions included in processing logic 520 may be stored in a database, such as database 570 for example.

Anomaly detector model 550 may be in logical and/or electronic communication with a controller, such as controller 540, and receive feature data 530, via controller 540. Feature data 530 may comprise one or more features. A feature may comprise any one of a signal offset, signal broadband energy, count of spikes (pulses, steps) in the signal, characteristics of spikes (pulses, steps), modal amplitudes for a chosen set of modes, etc. Feature domain may comprise any of a real number, integer, Boolean, enumerable, or any other suitable value. Each feature may be represented in time-series (i.e., $x(t_1)$, $x(t_2)$, . . . $x(t_n)$). Sampling points in time (i.e., $x(t_1)$, $x(t_2)$, etc.) may be equally spaced, approximately equally spaced, predefined time points, or feature based. A feature may include an anomaly which may correspond to a FOD event. For example, a FOD event may be manifested via a brief or persistent change of a feature value or slope (e.g. a spike in positive or negative direction, a positive-to-negative or negative-to-positive spike, a step in positive or negative direction, a slope increase or decrease). The feature may be analyzed by an anomaly detector model to determine if the feature includes an anomaly and its location in time.

With reference to FIG. 8, exemplary first time-series signals having features which may define an anomaly are illustrated, in accordance with various embodiments. In this regard, with combined reference to FIG. 5 and FIG. 8, feature data 230 may comprise any of the time series signals provided in FIG. 8. In this regard, feature data 230 may comprise a signal similar to time-series 1, time-series 2, time-series 3, time-series 4, time-series 5, time-series 6, time-series 7, or time-series 8, as illustrated in FIG. 8. Time-series 1 may correspond to a broad-band energy signal. Time-series 2 may correspond to a narrow-band energy signal. Time-series 3 may correspond to a narrow-band energy signal. Time-series 4 may correspond to a particle count signal. Time-series 5 may correspond to a signal offset signal. Time-series 6 may correspond to an exceedance value signal. Time-series 7 may correspond to an accumulated particle mass signal. Time-series 8 may correspond to the coherence between sensor 1 and sensor 2. Having provided various time-series signals, as well as various examples to which the various time-series signals may correspond, it should be appreciated that the various time-series signals may correspond to any suitable signal for detecting anomalies and/or determining FOD events and are not limited to the examples provided herein.

In various embodiments, a time series signal 800 may comprise a nominal portion 801 and an anomaly portion 802. In this regard, a feature, such as broad-band energy for example, may comprise an anomaly. As described herein, said anomaly may correspond to a FOD event. In various embodiments, a time series signal 810 may comprise a nominal portion 811 and an anomaly portion 812. In this regard, a feature, such as a step change in time-series signal 810 for example, may comprise an anomaly which may correspond to a FOD event.

With reference to FIG. 5, an anomaly detector model may process data values, which may comprise a feature, included in feature data 530 to detect anomalies. An anomaly detector may process data values included in feature data 530 one by one. Anomaly detector model 550 may be configured to produce an anomaly detection signal (also referred to herein as a third time-series data) 552 in response to receiving feature data 530. In various embodiments, an anomaly detector model may report to a controller, such as controller 540, detected anomalies via anomaly detection signal 552. Anomaly detection signal 552 may comprise a time-series vector comprising values referred to herein as anomaly detectors. In various embodiments, the time-series vector may comprise values, or anomaly detectors, sampled at the third or pre-determined rate.

In various embodiments, an anomaly detection signal 552 may comprise a vector having a series of Boolean values wherein a Boolean value of one (1) may indicate the detection of an anomaly. In this manner, anomaly detection signal 552 may comprise a vector of ones and zeros, in accordance with various embodiments. In various embodiments, an anomaly detection signal 552 may comprise a vector having a series of characteristic values corresponding to the occurrence or likelihood of an anomaly. In various embodiments, a characteristic value may provide an anomaly description. For example, controller 540 may analyze, via anomaly detector model 550, feature data 530 and may output a time-series signal (i.e., the anomaly detection signal 552, also referred to herein as an anomaly trend) whose values correspond to the occurrence of an anomaly at a given time. In this regard, an anomaly detector model 550 may receive a feature time-series signal (i.e., feature data 530) as an input and may send an anomaly time-series signal (i.e., anomaly detection signal 552) as an output.

In various embodiments, anomaly detector model 550 may generate a plurality of anomaly detection signals corresponding to different features. For example, a first anomaly detection signal may correspond to a signal derived from detecting signal offsets and a second anomaly detection signal may correspond to a signal derived from detecting signal broadband energy. In this manner, each feature may be processed individually via anomaly detector model 550. Thus, each feature may contribute its own independent "vote" or potential event indication, in FOD event detection.

In various embodiments, controller 540 may send anomaly detection signal 552 to a FOD damage model 560. FOD damage model 560 may then analyze the anomaly detection signal 552 and may produce a FOD damage estimate 562, or score. FOD damage model 560, may be configured to evaluate detected anomalies in feature data 230, or feature data 530, in order to detect FOD damage in a number of scenarios. For example, FOD damage model 560 may make a certain set of assumptions regarding how a FOD event can occur and represent itself in time history of feature data 530. Different FOD data scenarios may require employing different methods and limits for data processing for FOD detection or a different set of limits. As such, implementation of the use of various model parameters such as coefficients and limits may define models used within the trending software.

In various embodiments, a single feature may be used to determine a FOD event. For example, a single feature, such as spike detection, may be used to generate anomaly detection signal 552 and FOD damage model 560 may generate FOD damage estimate 562 based on this anomaly detection signal.

In various embodiments, FOD damage model 560 may implement feature aggregation logic 564. In this regard, a number of features may be used to determine a FOD event. For example, a number of anomaly detection signals 552 corresponding to anomalies detected using different features from a single sensor may be used to determine a FOD event.

In various embodiments, FOD damage model 560 may implement sensor aggregation logic 566. In this regard, a number of sensors may be used to determine a FOD event. For example, a feature detected at a first time from a first sensor may be used along with a corresponding second feature detected at a second time from a second sensor to determine a FOD event, wherein the first sensor and the second sensor may be collocated. In this regard, a first sensor may be located upstream of a second sensor and the features may be detected at different times corresponding to the time for a foreign object to travel from the first sensor to the second sensor.

In various embodiments, FOD damage model 560 may implement evaluation logic 568. In this regard, anomaly detectors, in the form of anomaly detection signal 552, may be evaluated to determine if a FOD event has occurred. Evaluation logic 568 may be implemented in order to determine the likelihood that a FOD event occurred. Evaluation logic 568 may indicate the magnitude or degree of a FOD event.

In various embodiments, a controller, such as controller 540, may be configured to receive the FOD damage estimate 562 from FOD damage model 560 and may report a FOD damage health report (HR) 590. In various embodiments, the FOD damage HR may be reported in response to the FOD damage estimate being above a predetermined threshold.

In various embodiments, a database, such as database 570, may be configured to store and maintain data related to the calculation, monitoring, operation, and/or evaluation of at least one of anomaly trends, anomaly detection signals, actual parameters, anomaly detector models, FOD damage models, Sensor HRs, Data Integrity HRs, and/or FOD damage HRs. A database, such as database 570, may store and maintain data using any suitable method disclosed herein or known in the art and may be in logical and/or electronic communication with a controller, such as controller 540. A database, such as database 570, may be in logical and/or electronic communication using any method disclosed herein or known in the art, such as, for example, via wiring or radio frequency transmissions.

Controller 540 may be configured to perform the calculations associated with monitoring at least one foreign object debris (FOD) monitoring sensors. Controller 540 may be configured to perform the calculations associated with feature data 230, wherein calculating a FOD damage HR. A health report (HR) may include event time or interval, event type, event damaging index, impacted engine components, etc.

Figure 3:
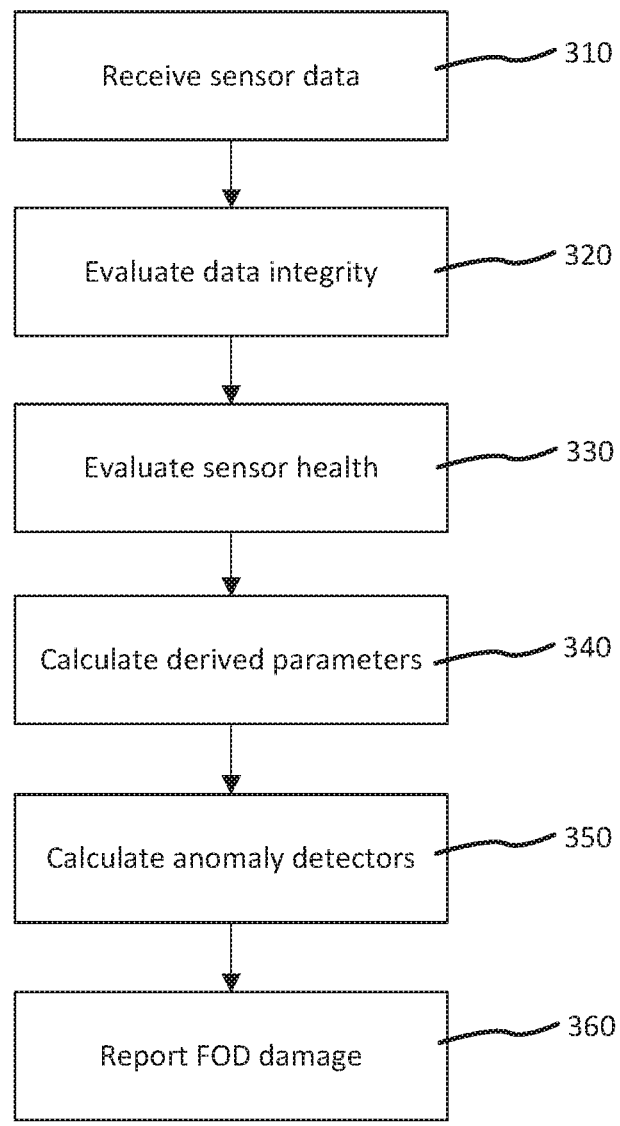
FIG. 3 illustrates a flow chart of a method for detecting FOD, in accordance with various embodiments.
Figure 4:
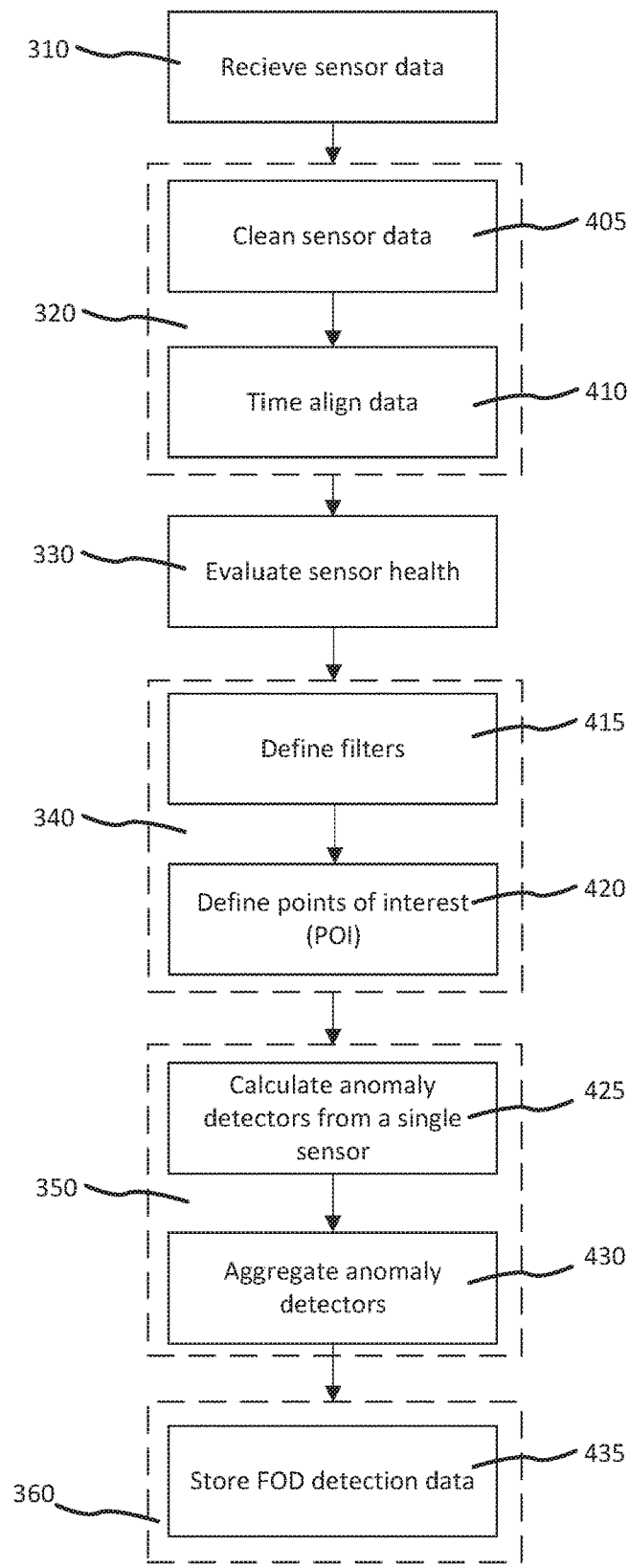
FIG. 4 illustrates a flow chart of a method for detecting FOD, in accordance with various embodiments.

In various embodiments, and with combined reference to FIG. 3, FIG. 4, and FIG. 5, a method 300 of foreign object debris detection may include implementing instructions stored in processing logic 520. Method 300 may comprise receiving sensor data (step 310) from one or more foreign object debris monitoring sensors. Step 310 may include receiving, by controller 540, feature data 230 obtained from a debris monitoring sensor in communication with a gas turbine engine 2. In various embodiments, feature data 230 may be stored to an on-board database and then moved to an off board database from which controller 540 may receive the feature data. Step 310 may include receiving, by controller 540, information or signals from database 570.

In various embodiments, method 300 may comprise evaluating data integrity (step 320). In various embodiments, step 320 may comprise controller 540 evaluating feature data 530 to determine a data integrity status, such as, for example, whether the data is valid or sufficient for use by an anomaly detector model. Feature data 530 may contain information about the sensor from which it originated. This information may be used to compare or determine a nominal behavior of the sensor data. This information may be used for sensor health analysis or for establishing a baseline when determining sensor health. In various embodiments, controller 540 may be configured to evaluate the feature data 530 to determine a data integrity status, such as, for example, whether the data is valid or sufficient for use by an anomaly detector model, and may report a Data Integrity HR. In various embodiments, controller 540 may be configured to evaluate feature data 230 to determine a sensor health status, such as, for example, whether the sensor is damaged or disconnected, and may report a Sensor HR. A Data Integrity or Sensor HR may highlight a maintenance advisory for sensor troubleshooting and performing other actions in the case of data gaps, data loss, or other events that may indicate undependable sensor health In various embodiments, step 320 may further comprise controller 540 reporting a Data Integrity HR in response to the data integrity status. Step 320 may be divided into sub-step 405 of cleaning the sensor data. For example, in the event that feature data 230 may only include positive values, cleaning the sensor data may include replacing negative values of feature data 230 with a default value or interpolated value. Cleaning may include conditioning data, such as feature data 230, for further analysis. Step 320 may be further divided into sub-step 410 of time aligning the actual parameter values for each debris monitoring sensor or for each type of data calculated during a primary data analysis step from a single debris monitoring sensor. In various embodiments, time alignment may include filling time gaps. In various embodiments, time alignment may include time aligning two or more distinct feature data 230 or feature data 530.

In various embodiments, method 300 may comprise evaluating sensor health (step 330). In various embodiments, step 330 may comprise controller 540 evaluating the feature data 230 to determine a sensor health status, such as, for example, whether the sensor is damaged or disconnected, and may include reporting a Sensor HR in response to the sensor health status.

In various embodiments, method 300 may comprise calculating derived parameters (step 340). Feature data 230 may include a number of time-series vectors, each resulting from a different data analysis of the data from a sensor, such as first sensor 210. Stated another way, feature data 230 may include a number of time-series vectors, wherein each of the time-series vectors comprises different types of calculations made from data received from a debris monitoring sensor. For example, a first vector may include data corresponding to threshold exceedances of the sensor signal, while another vector may include data corresponding to time averaged values of the sensor signal. It may be desirable to use any number of time-series vectors included in feature data 230 to calculate additional parameters. For example, a first time-series vector "A" may be added to another time-series vector "B" to calculate a third time-series vector "C". In various embodiments, any calculation or operation may be performed on one or more time-series vectors in order to derive a new or modified parameter. Step 340 may include normalization of data. In various embodiments, step 340 may include sub-step 415 defining filters. Sub-step 415 may include determining a start and stop point for a duration of time for which to analyze data. Step 340 may include sub-step 420 defining points of interest (POI). Defining points of interest (POI) may include selecting areas during a time of flight when FOD events are more likely to happen. Sub-step 420 may include determining anomalies in feature data 530 which may be of interest to further analyze.

In various embodiments, method 300 may comprise calculating anomaly detectors (step 350). As previously mentioned, anomaly detector model 550 may output an anomaly detection signal 552 comprising anomaly detectors which may aid in detecting various anomalies found in feature data 530. These anomaly detectors, or anomaly detection signals, may be scored to determine the likelihood of an occurrence of a FOD event. In various embodiments, each anomaly detection signal 552 may be scored individually or may be aggregated with anomaly detectors from a different sensor for an aggregate score. In this regard, step 350 may include sub-step 425 and sub-step 430. In various embodiments, sub-step 425 may include calculating anomaly detectors from a single sensor. In various embodiments, sub-step 430 may include aggregating anomaly detectors. Aggregating anomaly detectors from a number of sensors may increase the dependability and the fidelity of an HR. In various embodiments, step 350 may comprise controller 540 sending a number (n) of anomaly signals, where n≥1, such as, for example a first anomaly signal and a second anomaly signal, to the FOD damage model 560 and receiving a FOD damage estimate from the FOD damage model 560 in response to sending the anomaly signals. In various embodiments, step 350 may comprise monitoring and trending the anomaly detectors in order to calculate an overall 'score' (e.g. probability) for each anomaly detector.

Furthermore, although previously mentioned as aggregating anomaly detectors of different sensors, anomaly detector aggregation may include aggregating anomaly detectors from a similar sensor, but of different parameters. For example, a first anomaly signal may be calculated based upon a first parameter, such as threshold detection for example, and a second anomaly signal may be calculated based upon a second parameter, such as distortion analysis for example. In this regard, anomaly detectors from the first anomaly signal and the second anomaly signal may be aggregated to determine a FOD damage HR using a single sensor.

In various embodiments, step 350 may further comprise identifying FOD events, such as, for example, by a time history of anomalous data frames. In various embodiments, step 350 may further comprise validating FOD events against event parameters. In various embodiments, and as previously mentioned, the FOD damage model may comprise a sensor aggregation model. In various embodiments, step 350 may comprise applying a sensor aggregation model to the individual anomaly detector scores and FOD events to calculate a FOD damage estimate or calculated total FOD event score from the sensor aggregation model.

In various embodiments, method 300 may comprise reporting FOD damage (step 360). In various embodiments, step 360 may comprise controller 540 receiving the FOD damage estimate and comparing the FOD damage estimate to a predetermined detection threshold. In various embodiments, controller 540 may be configured to report a FOD damage HR in response to a FOD damage estimate exceeding a predetermined detection threshold. In various embodiments, step 360 may include sub-step 435 storing FOD detection data. In various embodiments, sub-step 435 may comprise storing FOD detection system data in database 570. In this regard, controller 540 may receive sensor data, such as a feature data 530 and send the data to the database 570. In various embodiments, controller 540 may be configured to send at least one of a time-series data, an anomaly detection signal, an anomaly trend, a FOD damage HR, a Sensor HR, or a Data Integrity HR to the database 570. Database 570 may receive and store the information sent by controller 540 using any suitable method described herein or known in the art.

Figure 6:
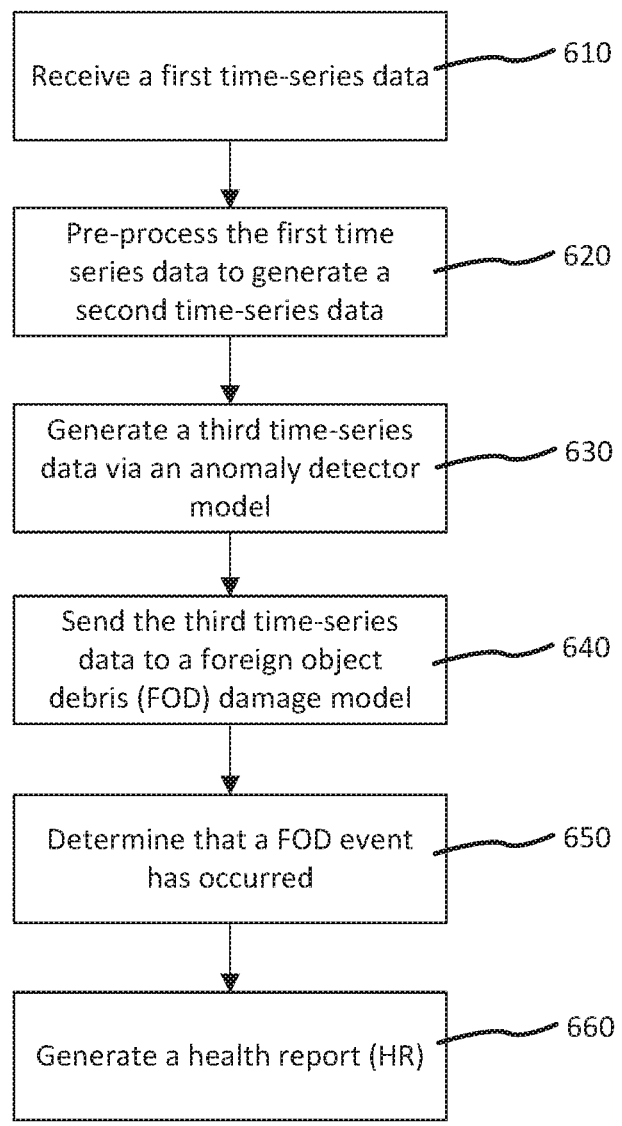
FIG. 6 illustrates a method for foreign object debris detection, in accordance with various embodiments.

After having provided various embodiments of a method for foreign object debris detection, with reference now to FIG. 6, a further embodiment of a method for foreign object debris detection is provided, in accordance with various embodiments, Method 600 may include receiving a first time-series data (see step 610). Method 600 may include pre-processing the first time-series data to generate a second time-series data (see step 620). Method 600 may include generating a third time-series data via an anomaly detector model (see step 630). Method 600 may include sending the third time-series data to a foreign object debris (FOD) damage model (see step 640). Method 600 may include determining that a FOD event has occurred (see step 650). Method 600 may include generating a health report (HR) (see step 660).

In various embodiments, with combined reference to FIG. 5 and FIG. 6, step 610 may include receiving, by controller 540, feature data 230. Step 620 may include pre-processing feature data 230 to generate feature data 530. Step 630 may include generating anomaly detection signal 552 via anomaly detector model 550. Step 630 may include generating anomaly detection signal 552 based on a pre-determined feature, such as a pulse for example. Step 640 may include sending, by controller 540, anomaly detection signal 552 to foreign object debris (FOD) damage model 560. Step 650 may include determining, by controller 540, that a FOD event has occurred based on data, such as anomaly detection signal 552 and/or FOD damage estimate 562, received from the FOD damage model 560. In various embodiments, Step 660 may include generating, by controller 540, a health report (HR) 590. The HR may be reported in response to a FOD event being detected.

Figure 7:
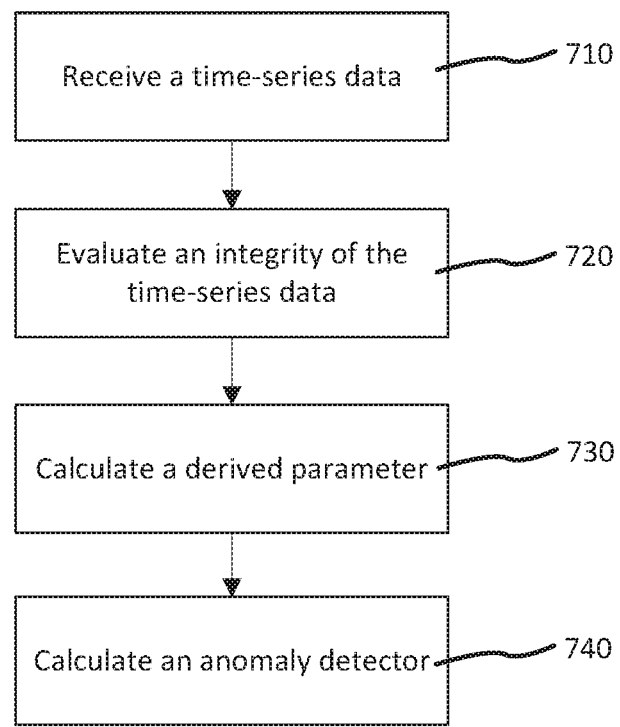
FIG. 7 illustrates a method for foreign object debris detection, in accordance with various embodiments.

Having described various operations configured to be performed by controller 230 (see FIG. 2), with reference now to FIG. 7, a further embodiment of operations performed by a controller included in a system for foreign object debris detection is provided, in accordance with various embodiments, Method 700 may include receiving a time-series data (see step 710). Method 700 may include evaluating an integrity of the time-series data (see step 720). Method 700 may include calculating a derived parameter (see step 730). Method 700 may include calculating an anomaly detector (see step 740).

With combined reference to FIG. 5 and FIG. 7, step 710 may include receiving, by controller 540, feature data 230. Step 720 may be similar to step 320 (see FIG. 3). Step 730 may be similar to step 340 (see FIG. 3). Step 740 may be similar to step 350 (see FIG. 3).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for foreign object debris (FOD) detection in a gas turbine engine comprising:
    receiving, by a controller, a first feature data from a database, wherein the first feature data comprises a first feature, the first feature data measured by a first gas turbine engine sensor;
    receiving, by the controller, a second feature data from the database, wherein the second feature data comprises a second feature, wherein the first feature is different from the second feature, and the second feature data is measured by the first gas turbine engine sensor;
    pre-processing, by the controller, the first feature data, wherein the pre-processing further causes the controller to calculate a derived parameter using the first feature data;
    generating a first anomaly detection signal, via an anomaly detector model, using the first feature data and the derived parameter, wherein the first anomaly detection signal indicates at least one anomaly based upon the first feature;
    generating a second anomaly detection signal, via the anomaly detector model, using the second feature data, wherein the second anomaly detection signal indicates at least one other anomaly based upon the second feature;
    sending, by the controller, the first anomaly detection signal to a FOD damage model;
    sending, by the controller, the second anomaly detection signal to the FOD damage model;
    determining, by the controller, that a FOD event has occurred based upon the first anomaly detection signal and the second anomaly detection signal; and
    generating, by the controller, a health report (HR) indicating the likelihood that the FOD event has occurred based upon the first anomaly detection signal and the second anomaly detection signal.

2. The method of claim 1, wherein the pre-processing further causes the controller to at least one of:
    evaluate an integrity of the first feature data;
    evaluate a health of the first gas turbine engine sensor; or
    clean the first feature data.

3. The method of claim 1, wherein the generating the first anomaly detection signal includes calculating, by the controller, an anomaly detector, wherein the anomaly detector is based upon the first feature data.

4. The method of claim 3, wherein the calculating the anomaly detector includes analyzing the first feature data, the first anomaly detection signal comprising a vector of values including the anomaly detector.

5. The method of claim 4, wherein the first anomaly detection signal comprises at least one of a Boolean value or a characteristic value providing information about an anomaly.

6. The method of claim 4, wherein the anomaly detector model is configured to produce the first anomaly detection signal comprising the anomaly detector in response to receiving the first feature data.

7. The method of claim 6, wherein at least one of the first feature data, the second feature data, the first anomaly detection signal, the second anomaly detection signal, the anomaly detector, the HR, the anomaly detector model, or the FOD damage model are stored in the database, wherein the database is in electronic communication with the controller.

8. The method of claim 1, wherein the pre-processing further causes the controller to at least one of:
    align the first feature data with respect to time;
    define a filter for the first feature data; and
    define a point of interest of the first feature data.

9. A system for foreign object debris (FOD) detection in a gas turbine engine, comprising:
    a controller in electronic communication with a memory, the controller configured to:
    receive a first time-series data from the memory, wherein the first time-series data is measured by a first debris monitoring sensor coupled to the gas turbine engine;
    receive a second time-series data from the memory, wherein the second time-series data is measured by a second debris monitoring sensor coupled to the gas turbine engine, wherein the first debris monitoring sensor monitors a compressor section of the gas turbine engine and the second debris monitoring sensor monitors a turbine section of the gas turbine engine, the compressor section drives air along a core flow-path for compression and communication into a combustor section and subsequently expansion through the turbine section;

generate a first feature data based upon a first calculation using the first time-series data;

generate a second feature data based upon a second calculation selectively using at least one of the first time-series data or the second time-series data, wherein the first calculation is different from the second calculation in response to the second calculation being performed using the first time-series data;

detect at least one anomaly in the first feature data;

detect at least one other anomaly in the second feature data;

determine an occurrence of a FOD event based upon the at least one anomaly and the least one other anomaly, wherein the at least one anomaly corresponds to a first FOD event in the compressor section of the gas turbine engine and the at least one other anomaly corresponds to a second FOD event in the turbine section of the gas turbine engine; and report a FOD damage health report (HR) in response to the calculated anomaly indicating the occurrence of a FOD event.

10. The system of claim 9, wherein the controller is further configured to:

evaluate a health of at least one of the first debris monitoring sensor and the second debris monitoring sensor;

clean the first time-series data;

align the first time-series data with respect to time;

define a filter for the first time-series data; or define a point of interest of the first time-series data.

11. The system of claim 9, wherein the controller generates an anomaly detector in response to the controller detecting the at least one anomaly, wherein detecting the at least one anomaly includes analyzing the first time-series data and generating a time-series vector of values including the anomaly detector.

12. The system of claim 11, wherein the time-series vector comprises a Boolean value.

13. The system of claim 11, wherein the controller implements an anomaly detector model, the anomaly detector model configured to produce an anomaly detection signal comprising the time series vector of values including the anomaly detector in response to receiving the first time-series data, and wherein the controller implements a FOD damage model, the FOD damage model configured to produce a FOD damage estimate in response to receiving the anomaly detection signal.

14. The system of claim 13, wherein at least one of the first time-series data, the anomaly detection signal, the anomaly detector, the FOD damage HR, the anomaly detector model, or the FOD damage model are stored in a database, wherein the database is in electronic communication with the controller.

15. The system of claim 9, wherein the system for foreign object debris detection further comprises a third debris monitoring sensor proximate at least one of a fan section, the compressor section, the combustor section or the turbine section of the gas turbine engine.

16. The system of claim 9, wherein the first debris monitoring sensor measures the first time-series data at a first sampling rate and the second debris monitoring sensor measures the second time-series data at a second sampling rate, the first sampling rate is different from the second sampling rate.

17. The system of claim 9, wherein the first debris monitoring sensor is located upstream of the second debris monitoring sensor and the first FOD event in the compressor section is detected at a first time and the second FOD event in the turbine section is detected at a second time, wherein a difference between the first time and the second time corresponds to a time for a foreign object to travel from the first debris monitoring sensor to the second debris monitoring sensor.

18. An article of manufacture including a tangible, non-transitory computer-readable storage medium having instructions stored thereon for detecting foreign object debris in a gas turbine engine that, in response to execution by a controller, cause the controller to perform operations comprising:

receiving, by the controller, a first time-series data from the memory, wherein the first time-series data is measured by a first debris monitoring sensor signal;

receiving, by the controller, a second time-series data from the memory, wherein the second time-series data is measured by a second debris monitoring sensor coupled to the gas turbine engine, wherein the first debris monitoring sensor monitors a compressor section of the gas turbine engine and the second debris monitoring sensor monitors a turbine section of the gas turbine engine, the compressor section drives air along a core flow-path for compression and communication into a combustor section and subsequently expansion through the turbine section;

generating, by the controller, a first feature data based upon a first calculation using the first time-series data;

generating, by the controller, a second feature data based upon a second calculation selectively using at least one of the first time-series data or the second time-series data, wherein the first calculation is different from the second calculation in response to the second calculation being performed using the first time-series data;

detecting, by the controller, at least one anomaly in the first feature data;

detecting, by the controller, at least one other anomaly in the second feature data;

determining, by the controller, an occurrence of a FOD event based upon the at least one anomaly and the at least one other anomaly, wherein the at least one anomaly corresponds to a first FOD event in the compressor section of the gas turbine engine and the at least one other anomaly corresponds to a second FOD event in the turbine section of the gas turbine engine; and reporting, by the controller, a FOD damage health report (HR) in response to the detected anomaly indicating the occurrence of a FOD event.

19. The article of manufacture of claim 18, wherein the operations further comprise evaluating, by the controller, a health of at least one of the first debris monitoring sensor and the second debris monitoring sensor.

20. The article of manufacture of claim 18, wherein the operations further comprise at least one of:

cleaning, by the controller, the first time-series data;

aligning, by the controller, the first time-series data with respect to time;

defining, by the controller, a filter for the first time-series data; or defining, by the controller, a point of interest of the first time-series data.

* * * * *